(12) United States Patent
Yoshioka et al.

(10) Patent No.: US 8,911,674 B2
(45) Date of Patent: Dec. 16, 2014

(54) ELECTRICALLY HEATED CATALYST

(75) Inventors: Mamoru Yoshioka, Susono (JP);
Noriaki Kumagai, Susono (JP); Naoya Takagi, Mishima (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 0 days.

(21) Appl. No.: 13/821,919

(22) PCT Filed: Sep. 10, 2010

(86) PCT No.: PCT/JP2010/065602
§ 371 (c)(1),
(2), (4) Date: Mar. 8, 2013

(87) PCT Pub. No.: WO2012/032650
PCT Pub. Date: Mar. 15, 2012

(65) Prior Publication Data
US 2013/0164185 A1 Jun. 27, 2013

(51) Int. Cl.
*B01D 50/00* (2006.01)

(52) U.S. Cl.
USPC ............................. 422/174; 422/179

(58) Field of Classification Search
CPC ... F01N 3/2026; F01N 3/2006; F01N 3/2803; F01N 3/2013; F01N 2240/16; F01N 13/148
USPC .............. 422/174, 177, 180; 60/300
See application file for complete search history.

(56) References Cited

U.S. PATENT DOCUMENTS

| | | | | |
|---|---|---|---|---|
| 5,070,694 A | * | 12/1991 | Whittenberger | ............... 60/300 |
| 5,177,961 A | * | 1/1993 | Whittenberger | ............... 60/300 |
| 5,232,671 A | * | 8/1993 | Brunson et al. | ............... 422/174 |
| 6,824,744 B1 | | 11/2004 | Stoepler et al. | |
| 8,388,788 B2 | * | 3/2013 | Yoshimi et al. | ............... 156/188 |

FOREIGN PATENT DOCUMENTS

| | | | |
|---|---|---|---|
| DE | 19753609 A1 | * | 6/1999 |
| GB | 2425073 A | * | 10/2006 |
| JP | 5-269387 A | | 10/1993 |

* cited by examiner

*Primary Examiner* — Tom Duong
(74) *Attorney, Agent, or Firm* — Sughrue Mion, PLLC

(57) ABSTRACT

The flow of electricity to the case (4) of an electrically heated catalyst (1) is inhibited. The heating element (2), the case (4), and the electrically insulating inner pipe (3) provided between the heating element (2) and the case (4) and inner mats 51 and 52 that are shorter in the direction of the flow of exhaust gases than inner pipe (3) that are provided in a compressed condition between heating element (2) and inner pipe (3), and outer mats 53 and 54 that are shorter in the direction of the flow of exhaust gases than inner pipe (3) that are provided in a compressed condition between inner pipe (3) and case (4) are provided and the load per unit area acting upon inner pipe (3) at the contact surface between inner pipe (3) and outer mats 53 and 54 is larger than the load born per unit area of acting upon the heating element (2) at the contact surface between the inner mats 51 and 52 and heating element (2).

4 Claims, 2 Drawing Sheets

ELECTRICALLY HEATED CATALYST

CROSS-REFERENCE TO RELATED APPLICATIONS

Figure 1:
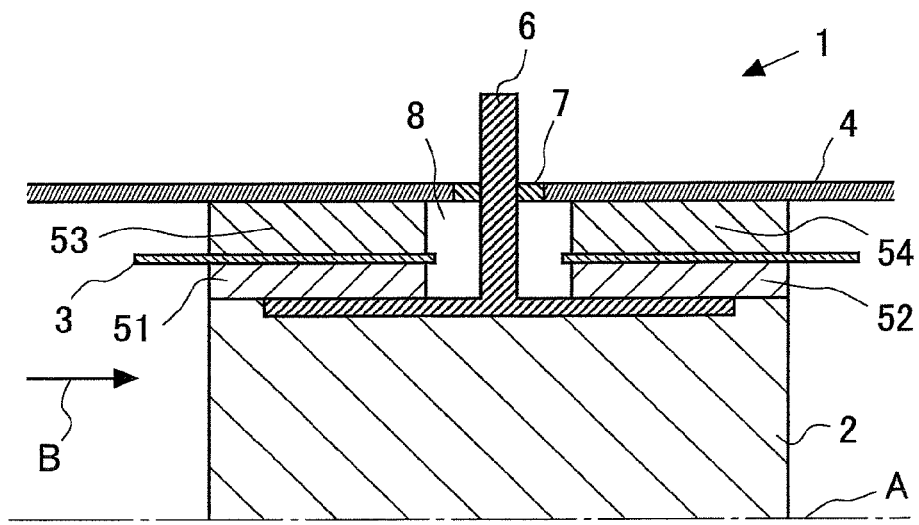

This application is a National Stage of International Application No. PCT/JP2010/065602 filed Sep. 10, 2010, the contents of all of which are incorporated herein by reference in their entirety.

TECHNICAL FIELD

The present invention relates to an electrically heated catalyst.

BACKGROUND TECHNOLOGY

Technology providing an insulating mat between a catalyst carrier heated by electrical conduction and a case containing the carrier of the said catalyst is known (For example, refer to Patent Reference 1). It is possible to inhibit the flow of electricity by means of this mat in the case where electricity is conducted through the catalyst carrier.

However, because moisture is contained in engine exhaust gasses, water sometimes condenses in the case or the like. This water flows inside the case, attaches to the mat and is then absorbed in the mat. Water absorbed in the mat migrates to the center of the mat, and then, because the water in the mat is vaporized by the heat of the exhaust gas and the heat of the heating element, it is removed over time. However, if the engine is started and stopped repeatedly within a relatively short time, the quantity of condensed water increases, and removal of the water within the mat becomes difficult. Because the humidity in the vicinity of the electrodes increases as a result, and the insulation resistance between the electrodes and the case decreases, there is the concern that electricity will flow from the electrodes to the case.

PRIOR ART LITERATURE

Patent Literature

Patent Publication 1: Japanese Laid Open Patent Application 05-269387.

SUMMARY OF THE INVENTION

Problems the Invention was Intended to Overcome

The present invention was sought in view of the aforestated problem points, and its objective is to inhibit the flow of electricity in the cases of electrically heated catalysts.

Means of Overcoming the Problem

To achieve the aforestated objective, the electrically heated catalyst of the present invention is equipped with
a heating element that heats by electrical conduction,
a case that houses the said heating element,
an inner pipe located between the said heating element and the said case that provides electrical insulation,
an inner mat disposed in a compressed condition between the said heating element and the said inner pipe that together with providing electrical insulation supports the said heating element and that is shorter in the direction of the flow of exhaust gasses than the said inner pipe,
and an outer mat disposed in a compressed condition between the said inner pipe and the said case that together with providing electrical insulation supports the said inner pipe and that is shorter in the direction of the flow of exhaust gasses than the said inner pipe
and,
the load per unit area acting on the said inner pipe at the contact surface between the said inner pipe and the said outer mat is larger than the load per unit area acting on the said heating element at the contact area between the said inner mat and the said heating element.

The direction of flow of the exhausts gasses may correspond to the direction of the central axis of the case or heating elements. The heating element may be used as a catalyst carrier or may be located upstream from the catalyst. Because the heating element is heated by conducting current through it, it is possible to raise the temperature of the catalyst. Moreover, by causing the load per unit area acting on the inner pipe at the contact surface between the inner pipe and the outer mat to be larger than the load per unit area acting on the heating element at the contact area between the inner mat and the heating element, it is possible to reduce the maximum amount of water that can be retained in the outer mat. That is to say, because the compression of the outer mat is greater than that of the inner mat, the ratio (hereinafter the "Pore Ratio") of the total pore volume to the volume of the outer mat is low. As a result, the amount of water that can be retained by the outer mat is smaller. That being the case, because all of the water is vaporized from the external mat and the time until this water is removed is shortened, it is possible to inhibit the rise in humidity around the electrode. In this way, it is possible to inhibit the flow of electricity from the electrode to the case.

In the present invention, the said outer mat may be shorter in the direction of the flow of exhaust gasses than the said inner mat. That is to say, because the load per unit area acting on the outer mat at the contact surface with the inner pipe is large, even if that contact surface is smaller than the contact surface between the outer mat and the inner pipe, the outer mat is able to deliver the strength necessary to fix the inner pipe. In other words, even if the outer mat is shorter in the direction of flow of the exhaust gasses than the inner mat, it is able to fix the inner pipe. Moreover, because it is possible to make the volume of the outer mat smaller, it is possible to further reduce the quantity of water retained in the said outer mat. By doing this, it is possible to inhibit the rise in humidity around the electrode.

In the present invention, an electrode is provided that is in contact with the said heating element, and the said outer mat upstream with respect to the electrode in the direction of the flow of exhaust gasses, may bear a larger load per unit area acting on the said inner pipe at the contact surface with the said inner pipe than downstream. Here, the degree of influence on the reduction of electrical insulation resistance will be greater for a mat placed upstream from the electrode than for a mat placed downstream from the electrode. That is to say the water retained in a mat upstream with respect to the electrode will be forced by the exhaust gases in the direction of approaching the electrode, whereas water retained in a mat downstream from the electrode will be forced by the exhaust gases in the direction away from the electrode. Because, by making it more difficult for the mat upstream from the electrode to retain water, it is possible to inhibit the increase in humidity around the electrode, it is thus possible to inhibit the flow of electricity from the electrode to the case.

An electrode connected to the said heating element is provided by the present invention, and the said outer mat, may be shorter in length in the direction of flow of exhaust gases upstream from the electrode in the direction of the flow of exhaust gases than downstream. If this is the case, then, because the area of the mat upstream is smaller, it is possible to reduce the quantity of water retained in the said upstream mat. Accordingly, because by making retention of water in the mat upstream from the electrode more difficult, it is possible to inhibit the increase in humidity around the electrode, it is possible to inhibit the flow of electricity from the electrode to the case. Moreover, the outer mat in the downstream direction may also be longer by the portion of the outer mat upstream that has been shortened.

Moreover, the said electrode may connect to the heating element further upstream in the direction of the flow of exhaust gasses relative to the center of the said heating element. If this is so, then the upstream outer mat can be shortened and the downstream outer mat can be lengthened. In this case, the inner mat also is shortened more on the upstream side than the downstream side.

Effects of the Invention

According to the present invention, it is possible to inhibit the flow of electricity to the electrically heated catalyst case.

SIMPLE EXPLANATION OF THE DRAWINGS

[FIG. 1.] is a drawing showing the summary structure of the electrically heated catalyst pertaining to Practice Examples 1 and 3.

Figure 2:
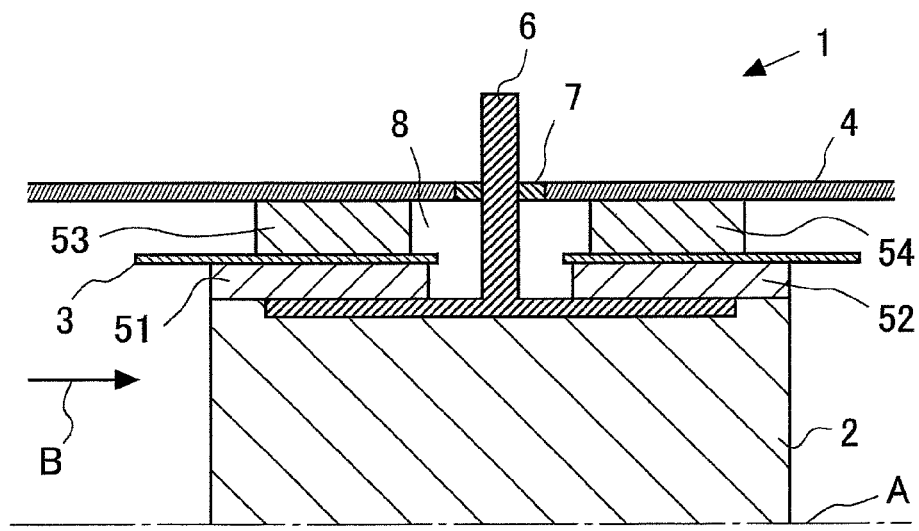

[FIG. 2.] is a drawing showing the summary structure of the electrically heated catalyst pertaining to Practice Example 2.

Figure 3:
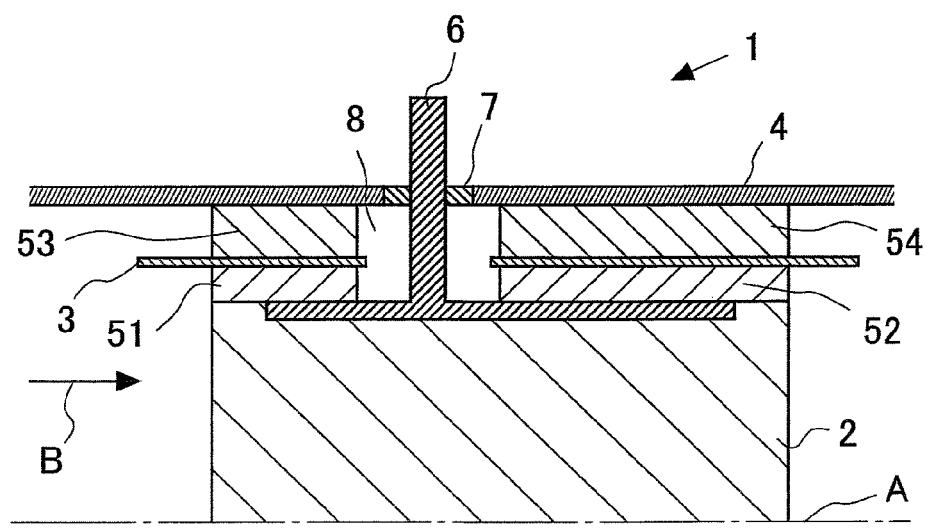

[FIG. 3.] is a drawing showing the summary structure of the electrically heated catalyst pertaining to Practice Example 4.

FORM OF PRACTICE OF THE INVENTION

Explanation is made below based on the drawings of the concrete embodiments of the electrically heated catalyst pertaining to the present invention. Moreover, the following practice examples may be combined as appropriate.

Practice Example 1

In FIG. 1., the drawing shows the summary structure of electrically heated catalyst 1 pertaining to the present practice example. Moreover, electrically heated catalyst 1 pertaining to the present practice example is equipped to the exhaust pipe of an engine mounted on a vehicle. The engine may be a diesel engine or a gasoline engine. And, it can also be used in vehicles employing hybrid systems equipped with electric motors.

Electrically Heated Catalyst 1 shown in FIG. 1., is a cross sectional drawing cut longitudinally through the electrically heated catalyst 1 along the central axis A of electrically heated catalyst 1. Moreover, because the form of electrically heated catalyst 1, is symmetrical to the central axis A of said electrically heated catalyst 1, only the upper part is shown in FIG. 1. Additionally, arrow mark B in FIG. 1 shows the direction of flow of exhaust gasses.

Electrically Heated Catalyst 1 pertaining to the present practice example is equipped with cylindrical catalyst carrier 2 centered along central axis A. Then, in order from the side of central axis A, are provided catalyst carrier 2, inner pipe 3, and case 4. Moreover, mat 5 is provided between catalyst carrier 2 and inner pipe 3, and between inner pipe 3 and case 4.

The material used in catalyst carrier 2 is an electrical insulator and generates heat by conduction of electricity. As the material for catalyst carrier 2, for example, SiC may be used. Catalyst Carrier 2 extends in the direction of flow of exhaust gas B (this could also be the direction of central axis A) and the perpendicular cross section to the direction of the flow of exhaust gas possesses multiple passages arranged in the form of a honeycomb. The exhaust gasses flow through these passages. The outer form of catalyst carrier 2 is, for example, a cylinder centered on central axis of the exhaust pipe. Moreover, the form of the cross section of catalyst carrier 2 with cross section perpendicular to central axis A may be, for example, a cylindroid. Central axis A is the common central axis of the exhaust pipe, the catalyst carrier 2, the inner pipe 3, and the case 4. Moreover, in the present practice example, catalyst carrier 2 corresponds to the heating element of the present invention. In addition, even in the event that the heating elements are placed further upstream than the catalyst, it is possible to use them in the same way as in the present practice example.

The catalyst is supported by the catalyst carrier 2. It is possible to load the catalyst carrier with, for example, oxidation catalysts, three way catalytic converters, NOx adsorber type catalysts, and selective reduction type NOx catalysts. Two electrodes 6 are attached to the catalyst carrier 2, and between the said electrodes 6, electricity is passed through the catalyst by placing a potential across the said electrodes 6. Catalyst carrier 2 generates heat by the electrical resistance of the said catalyst carrier 2.

As the material for inner pipe 3, for example, electrically insulating materials such as alumina may be used. The inner pipe 3 is formed into a tubular shape with the central axis A being located as a center thereof.

As the material for case 4, metal is used, and for example, stainless steel may be used. Additionally an aperture 41 is opened in case 4 to allow passage of electrode 6. The diameter of this aperture 41 is larger than the diameter of electrode 6. For this reason, case 4 is separated from electrode 6. Thus insulator part 7 is provided supporting electrode 6 in Aperture 41 opened in case 4. An insulator is used as the material of this insulator part 7. Additionally, insulator part 7 is placed in the space between case 4 and electrode 6. Moreover, in order to pass electrode 6, inner pipe 3 is positioned separated from each electrode 6 proportionally more upstream than downstream with respect to the electrodes 6.

An electrical insulator is used for mat 5, and, for example, ceramic fiber the chief constituent of which is alumina, may be used. Mat 5 is wound on the outer circumferential surface of the catalyst carrier 2 and the outer circumferential surface of the inner pipe 3. Because Mat 5 covers the outer circumferential surface of catalyst carrier 2 (a surface parallel to central axis A), when electricity is conducted into catalyst carrier 2, the flow of electricity is inhibited to inner pipe 3 and case 4.

Mat 5 is comprised of inner mats 51 and 52 provided between inner pipe 3 and catalyst carrier 2 and of outer mats 53 and 54 provided between case 4 and inner pipe 3. Moreover, inner mats 51 and 52 comprise inner mat 51 that is upstream from electrode 6 and inner mat 52 that is downstream from electrode 6. Additionally, outer mats 53 and 54 comprise outer mat 53 that is upstream from the electrode and outer mat 54 that is downstream from the electrode.

Thus, in the surrounding Electrode 6, on the outside of catalyst carrier 2 and the inside of case 4, there is formed electrode chamber 8 consisting of a space surrounded and closed by catalyst carrier 2, inner pipe 3, case 4, and mat 5.

Inner mats 51 and 52 and outer mats 53 and 54 are substantially the same length in the direction of the flow of exhaust gasses. Moreover, inner mat 51 which is upstream from electrode 6 and inner mat 52 which is downstream from the electrode 6 are substantially the same length in the direction of the flow of exhaust gasses. Additionally, outer mat 53 which is upstream from electrode 6 and outer mat 54 which is downstream from the electrode 6 are substantially the same length in the direction of the flow of exhaust gasses.

Additionally, inner pipe 3 is longer than mat 5 in the direction of the flow of exhaust gasses (the direction of central axis A is also acceptable). That is to say, inner pipe 3 protrudes beyond mat 5 both upstream and downstream.

Inner mats 51 and 52 are wound around the outer circumference of the catalyst carrier 2. Moreover, subsequently, they are introduced into the inside of inner pipe 3. The outer diameter of the said inner mats 51 and 52 when they are wound around catalyst carrier 2 is larger than the inner diameter of inner pipe 3. For this reason, when inner mats 51 and 52 are housed inside inner pipe 3, because the said inner mats 51 and 52 are compressed, inner pipe 3 is fixed to the inside of inner pipe 3 by the resiliency of the said inner mats 51 and 52.

Moreover, outer mats 53 and 54 are wound on the outer circumference of inner pipe 3. Moreover, subsequently, they are introduced into the inside of case 4. The outer diameter of the said outer mats 53 and 54 when they are wound around inner pipe 3 is larger than the inner diameter of case 4. For this reason, when outer mats 53 and 54 are housed inside case 4, because the said outer mats 53 and 54 are compressed, inner pipe 3 is fixed to the inside of case 4 by the resiliency of the said outer mats 53 and 54.

Therefore, the load per unit area acting on inner pipe 3 at the contact surface of outer mats 53 and 54 and the said inner pipe 3 is larger than the load per unit area acting on catalyst carrier 2 at the contact surface of inner mats 51 and 52 and the said catalyst carrier 2. For example, it is possible to increase the aforementioned load by increasing the compression ratio of outer mats 53 and 54 when they are housed in case 4 to above the compression ratio of inner mats 51 and 52 when they are housed in inner pipe 3. In order to increase the compression ratio of outer mats 53 and 54, for example, the external diameters of outer mats 53 and 54 may be increased after the said outer mats 53 and 54 have been wound onto inner pipe 3. In the same manner, the thickness of outer mats 53 and 54 before housing them in case 4 may be increased.

Water condensed upstream from catalyst carrier 2 in the electrically heated catalyst 1 configured in this way will flow to the inner wall of case 4 and adhere to mat 5. This water will adhere to outer mats 53 and 54 between the inner pipe 3 and case 4. That is to say, because inner pipe 3 protrudes further upstream and downstream than mat 5, the water will be inhibited from entering the interior of inner pipe 3. By this means, a short circuit through water is inhibited between case 4 and catalyst carrier 2 at mat 5, upstream and downstream.

Moreover, when particulate matter in the exhaust gas (hereinbelow "PM") adheres to mat 5 or inner pipe 3, there is the concern that a short circuit may occur between catalyst carrier 2 and case 4 through the said PM. However, there is the protrusion of inner pipe 3 beyond mat 5, and because the temperature obtained from the heat of the exhaust gasses becomes high at that protrusion, the PM adhering to the said inner pipe 3 can be oxidized and removed. By this means short circuiting through the PM between case 4 and catalyst carrier 2 is inhibited.

The water adhering to mat 5 vaporizes due to the heat of exhaust gasses and the heat of catalyst carrier 2. However, when the quantity of adhering water increases, a part of that is quickly retained by mat 5 without vaporizing. Then the water passes through mat 5 and arrives at electrode chamber 8 around electrode 6. When the humidity of electrode chamber 8 increases as a result of this, concerns arise as to the flow of electricity between electrode 6 and case 4. If that happens, then there is the further concern that when there is a need to raise the temperature of the catalyst carrier 2, it will be impossible to induce the flow of electricity.

To prevent this, by increasing the load per unit area acting on inner pipe 3 at the contact surface between outer mats 53 and 54 and the said inner pipe 3, it is possible to inhibit the infiltration of water into the said outer mats 53 and 54. Moreover, it is possible to reduce the quantity of water that infiltrates outer mats 53 and 54. That is to say, because the compression ratio of outer mats 53 and 54 is high, due to the pore ratio of outer mats 53 and 54 being reduced, it is possible to reduce the maximum amount of water that may be retained by the said outer mats 53 and 54. As a result, it is possible to shorten the time until removal by vaporization of the water from outer mats 53 and 54. By doing this, it is possible to conduct electricity to catalyst carrier 2 quickly. Moreover, it is possible to inhibit the flow of electricity from electrode 6 to case 4.

In addition, in the present invention, although it was explained that inner mats 51 and 52 and outer mats 53 and 54 are divided upstream and downstream of the electrode 6, they may also constitute a single undivided unit upstream and downstream. In this case, to form electrode chamber 8, an aperture may be opened in mat 5.

Moreover, because the SiC used in catalyst carrier 2 is less durable than the alumina used in inner pipe 3, if the compression ratio of inner mats 51 and 52 is increased, because the stress acting upon the catalyst carrier 2 is large, there is the concern that the said catalyst carrier 2 may be damaged. On the other hand, because inner pipe 3 is more durable than catalyst carrier 2, the compression ratio of outer mats 53 and 54 may be higher. That is to say, in the present practice example, the quantity of water retained in outer mats 53 and 54 may be reduced while avoiding damage to catalyst carrier 2.

Reference Example

As explained in Practice Example 1, by reducing the quantity of water that can be retained in outer mats 53 and 54 to less than that for inner mats 51 and 52, it is possible to reduce quickly the humidity inside electrode chamber 8. Consequently, small pore ratios may be used in the materials for outer mats 53 and 54. That is to say, the materials used in inner mats 51 and 52 may be different from the materials used in outer mats 53 and 54.

Here, the temperature of inner mats 51 and 52 increases due to the heat from catalyst carrier 2. As a result, high heat resistance is necessary. On the other hand, outer mats 53 and 54 are separated from catalyst carrier 2, and because the catalyst carrier is cooled by the outer air on the outside of case 4, the temperature is comparatively low. As a result, because heat resistance may be lower, the range of selection of materials is wider.

Practice Example 2

FIG. 2 is a drawing showing a summary structure of electrically heated catalyst 1 pertaining to the present practice example. In practice example 1, inner mats 51 and 52 and outer mats 53 and 54 have substantially the same length in the direction of the flow of exhaust gasses, however, in the present practice example, outer mats 53 and 54 are shorter.

Here, because by increasing the compression ratio of outer mats 53 and 54, the force supporting the inner pipe 3 is increased, it is possible to fix inner pipe 3 even if the length of outer mats 53 and 54 are shortened in the direction of central axis A by that portion. That is to say, even if the contact surface area between outer mats 53 and 54 and inner pipe 3 narrows, because the aforementioned load increases, it is possible to support inner pipe 3. By shortening the length in the direction of central axis A of outer mats 53 and 54 in this way, it is possible to reduce the area of the said outer mats 53 and 54. Because it is possible to further reduce the quantity of water retained in outer mats 53 and 54 in this way, it is possible to more quickly remove the water from outer mats 53 and 54. By doing this, it is possible to inhibit the flow of electricity from electrode 6 to case 4.

Practice Example 3

In practice example 1, the load per unit area acting on inner pipe 3 by outer mat 53 that was upstream from electrode 6 and outer mat 54 that was downstream from electrode 6 are the same. On the other hand, in the present practice example, the aforementioned load on outer mat 53 that is upstream from electrode 6 is larger than that on outer mat 54 that is downstream from electrode 6. Moreover, the lengths of outer mats 53 and 54 are shorter in the direction of central axis A than the lengths of inner mats 51 and 52, the same as in practice example 2.

For example, outer mat 53 that is upstream from electrode 6, is made to possess a greater compression ratio than outer mat 54 which is downstream from electrode 6. Because of this, the external diameter of inner pipe 3 upstream from electrode 6 may be greater than the external diameter of inner pipe 3 downstream from electrode 6. Moreover, for example, the inner diameter of case 4 upstream of electrode 6 may be smaller than the inner diameter of case 4 downstream from electrode 6. Additionally, the external diameter of outer mats 53 and 54 when the said outer mats 53 and 54 are wound around inner pipe 3 may be adjusted so that they are larger upstream than downstream. By doing at least one of these, the load per unit area acting on inner pipe 3 of outer mat 53 upstream of electrode 6 is increased.

In the electrically heated catalyst 1 fashioned in this way, the quantity of water retained in outer mats 53 and 54 is reduced more upstream than downstream. Here the water retained in outer mats 53 and 54, forced by the exhaust gasses, flows downstream from upstream. As a result, the water retained in outer mat 53 upstream from electrode 6 exerts a larger influence on the humidity in electrode chamber 8 than the water retained in outer mat 54 downstream from electrode 6. With respect to this, the load per unit area of outer mat 53 upstream from electrode 6 acting upon inner pipe 3 is relatively greater. If this is the case, then because the quantity of water retained in outer mat 53 upstream from electrode 6 decreases, it is possible to inhibit the rise in humidity in electrode chamber 8. Thus, it is possible to more quickly remove water retained in outer mat 53 upstream from electrode 6. By these means it is possible to inhibit the flow of electricity to case 4 from electrode 6.

Practice Example 4

FIG. 3 is a drawing showing the summary structure of electrically heated catalyst 1 pertaining to the present practice example. In the present practice example, the lengths of inner mat 51 and outer mat 53 upstream from electrode 6 in the direction of the flow of exhaust gasses are shorter than the respective lengths of inner mat 52 and outer mat 54 downstream from electrode 6. As a result, electrode 6 is positioned upstream in the direction of the flow of exhaust gasses from the center of catalyst carrier 2. Moreover, the lengths of inner mat 51 and outer mat 53 upstream from electrode 6 in the direction of the flow of exhaust gasses are made equal to or greater than the lower limit value necessary to support inner pipe 3.

Here, the water retained by outer mats 53 and 54 flows downstream from upstream forced by the flow of exhaust gasses. As a result, the water retained in outer mat 53 upstream from electrode 6 exerts a larger influence on the humidity in electrode chamber 8 than the water retained in outer mat 54 downstream from electrode 6. That is to say, if the quantity if water that can be retained in outer mat 53 upstream from electrode 6 is reduced, even if the quantity of water that can be retained in outer mat 54 downstream from electrode 6 increases, it is possible to inhibit the increase in humidity in electrode chamber 8. Thus, by reducing the quantity of water that can be retained in outer mat 53 upstream of electrode 6 by shortening its length in the direction of the flow of exhaust gasses, it is possible to remove the water in the said outer mat 53 more quickly. By doing this, it is possible to inhibit the flow of electricity from the electrode to case 4.

EXPLANATION OF NUMBERED ITEMS

1. Electrically Heated Catalyst
2. Catalyst Carrier
3. Inner Pipe
4. Case
5. Mat
6. Electrode
7. Insulator part
8. Electrode Chamber
41. Aperture
51. Inner Mat
52. Inner Mat
53. Outer Mat
54. Outer Mat

The invention claimed is:
1. An electrically heated catalyst comprising:
a heating element that heats by electrical conduction,
a case that houses said heating element;
an inner pipe located between said heating element and said case that provides electrical insulation;
an inner mat, disposed in a compressed condition between said heating element and said inner pipe, that provides electrical insulation and supports said heating element, and said inner mat is shorter in a direction of a flow of exhaust gasses than said inner pipe;
an outer mat, disposed in a compressed condition between said inner pipe and said case, that provides electrical insulation and supports said inner pipe, and said outer mat is shorter in the direction of the flow of exhaust gasses than said inner pipe; and
an electrode that is in contact with said heating element, wherein
a load per unit area acting on said inner pipe at a contact surface between said inner pipe and said outer mat is larger than a load per unit area acting on said heating element at a contact surface between said inner mat and said heating element, and said outer mat is shorter in the direction of the flow of exhaust gasses than said inner mat, at both upstream and downstream of the electrode in the direction of the flow of exhaust gasses.

2. An electrically heated catalyst according to claim 1 wherein said outer mat upstream with respect to the electrode in the direction of the flow of exhaust gasses, bears a larger load per unit area acting on said inner pipe at the contact surface with said inner pipe than that downstream.

3. An electrically heated catalyst according to claim 1 wherein said outer mat upstream with respect to the electrode in the direction of the flow of exhaust gasses is longer than that downstream.

4. An electrically heated catalyst according to claim 3 wherein said electrode connects further upstream in the direction of the flow of exhaust gases relative to the center of the said heating element.

\* \* \* \* \*